3,366,560
PROCESS FOR PREPARING MOLDINGS OF DIENE-GRAFTED VINYL ALCOHOL-OLEFIN COPOLYMER RESINS
Toshihiko Yoshitake, Kiyokazu Imai, Hidenobu Sogi, and Katsuaki Hirano, Kurashiki, Japan, assignors to Kurashiki Rayon Co., Ltd., Kurashiki, Japan
No Drawing. Filed Mar. 8, 1965, Ser. No. 438,111
Claims priority, application Japan, Mar. 16, 1964, 39/14,357
12 Claims. (Cl. 204—159.15)

ABSTRACT OF THE DISCLOSURE

Moldings of vinyl alcohol-olefin copolymer resins having an excellent impact strength can be obtained by irradiating a powdery resin of vinyl alcohol-olefin copolymer such as vinyl alcohol-ethylene copolymer with ionizing radiation, contacting the irradiated resin with a dienic compound such as 1,3-butadiene or a monomer mixture of a dienic compound and a radical-copolymerizable vinyl monomer such as styrene in such a state that said resin does not lose the powdery form to provide the copolymer resin containing graft copolymers and molding the resulting resin directly or after milling.

---

The present invention relates to a process for preparing moldings of resins having a high impact resistance in which a vinyl alcohol-olefin copolymer is irradiated with ionizing radiation and then contacted with a dienic compound, a mixture of other vinyl monomer capable of effecting radical copolymerization with the dienic compound or a solution thereof with the production of a graft polymer-containing resin. These modified resins are suitable for molding with or without prior milling. The starting vinyl alcohol-olefin copolymers in general have low impact resistance.

The vinyl alcohol-olefin copolymers used as the starting material include the copolymers of vinyl alcohol and olefins having 2 to 4 carbon atoms. These copolymerized resins are generally obtained by saponifying the copolymers of vinyl esters such as vinyl acetate and olefins. The content of the olefin in said copolymers is 20 mol percent–98 mol percent in the case of ethylene, 15 mol percent–98 mol percent in the case of propylene or 10 mol percent–98 mol percent in the case of butylene. Vinyl ester coopolymer resins which have not been 100% saponified and containing residual ester groups may also be used as the starting resin in this invention. The impact strength of the moldings of the modified ethylene copolymer obtained by the invention is about 10 times that of the original starting resin, while that of the molding of the propylene copolymer resin shows about 7 times that of the original starting resin. The resin is preferably in the form of powder. The size of the powder is less than 1 cc. in volume of one grain. When the grain size is too large, it is difficult to cause the graft polymerization interiorly, so that such a grain is undesirable. The irradiation with ionizing radiation is preferably carred out under the condition free of oxygen though it may be performed in air. It is preferable that the temperature of irradiation is lower but the object can be attained at room temperature. The irradiation dose is preferably within the range of $10^4$–$10^8$ roentgens. When the irradiated resin is contacted with the dienic compound, a mixed monomer liquid containing the dienic compound or a solution thereof to cause the graft polymerization, it is preferable that the irradiated resin is slightly swelled to such an extent as not to lose the initial form to facilitate the graft polymerization interiorly when the resin is not swelled at all, swelled excessively or completely dissolved, it is difficult to effect the graft polymerization and the recovery of the polymer is quite difficult. In the graft polymerization, it is preferable that in the reaction system there is no oxygen but this object can be fully accomplished by replacing the air in the system by an inert gas, such as nitrogen and the like or by vaporizing partially the dienic compound to replace the air in the system by the dienic vapor. A suitable temperature for the graft polymerization is within the range of $-20°$ C. to $100°$ C. The methods for contacting the irradiated resin with the monomer include a method wherein the resin is fed into the reactor containing the monomer or the solution thereof so as not to contact with the liquid but to contact with the vapor. In order to improve the moldability of the graft polymer, a chain transfer agent such as carbon tetrachloride may be present during the graft polymerization. The ratio of graft expressed by percentage of the increase in weight based on the weight of the starting resin is preferably taken from 1 to 200%. At a too high ratio of graft, molding becomes difficult, so that the ratio of graft is more preferably taken at 3–200%.

The combinations of monomers to be used for the graft polymerization are, for example, butadiene, butadiene-acrylonitrile, diene-styrene, diene-methyl-methacrylate and the like. The dienic compounds are 1,3-butadiene and the polymerizable substituted derivatives of 1,3-butadiene such as isoprene, chloroprene and the like. The separation of the grafted resins is easily done by vaporizing the unreacted diene and then filtering the solution, after which the resin is washed and dried. The resins containing a graft polymer have an excellent blendability due to the fact that such resins are in the state that the graft polymer and the ungrafted polymer have been fully blended in the process of graft polymerization and portions of the chain of each resin have the same chemical structure. Consequently such resins can be molded directly. When the resins are to be molded after milling, it is sufficient to mill them only slightly. When milling, the ungrafted starting resins or polymer of the monomer used for the graft polymerization or both of them simultaneously can be added to the grafted resin and the mixtures are milled and then molded. These new graft polymers have excellent blendability and the resulting molded articles are homogeneous with excellent transparency. In addition, these products have excellent transparency. Moreover said moldings have considerably higher impact resistance than that of the starting resins. The term "moldings" herein means fibers, films, sheets, tubular articles and also all products having any configuration such as pellets, powder and the like.

Example 1

72.5 g. of a powdered copolymer of vinyl alcohol and ethylene having 40 mol percent of ethylene content and a degree of polymerization of 1,000 were irradiated with an electron beam to a dosage of $10^6$ roentgens and introduced into an enclosed vessel containing a solution consisting of 22 g. of acrylonitrile, 86 g. of butadiene and 72 g. of methanol. The atmosphere of vessel was replaced by nitrogen and the mixture was subjected to graft polymerization at room temperature for 19 hours. As the graft polymerization proceeds, the amount of the resin increased gradually and the progress of the polymerization could be observed visually. After the completion of reaction the butadiene was vaporized, and then the resin was filtered off and washed with methanol and dried. The ratio of graft polymerization was 20%. The granular resin containing the graft polymer thus obtained was milled by a kneader at 175° C. for 15 minutes. In this case, the resin was melted to transparent state. The fluidity of this resin was measured by a flow tester, and it showed good fluidity. The product obtained by press molding with metal mold at 180° C. was transparent and had an impact strength measured according to ASTM256 (Izod type), was 16.4 kg. cm./cm., notch (3.0 ft.-lb./in., notch). This value is 10 times if compared with 1.64 kg. cm./cm., notch (0.3 ft.-lb./in., notch) of the starting resin.

*Example 2*

60.0 g. of a powdered copolymer of vinyl alcohol and ethylene containing 48 mol percent of ethylene and having a degree of saponification of 92% and a degree of polymerization of 1,200 were irradiated with an electron beam to a dosage of $10^6$ roentgens, then immersed in 80 g. of butadiene to graft polymerize them for 15 hours. The reaction product was milled and molded. The molded product had an impact strength of 14.76 kg. cm./cm., notch (2.7 ft.-lb./in., notch).

*Examples 3–6*

The following table shows the starting materials and the impact strengths of three other examples of graft polymers produced according to the method of Example 1.

| Example No. | Copolymer | Content of olefin, percent | Monomer to be grafted | Impact strength, ft.-lb./in. notch (kg.-cm./cm., notch) |
|---|---|---|---|---|
| 3 | Vinyl alcohol ethylene | 45 | Butadiene, styrene | 2.5 (13.65) |
| 4 | Vinyl alcohol propylene | 30 | Butadiene | 2.1 (11.65) |
| 5 | ----do---- | 25 | Butadiene, acrylonitrile | 1.8 (9.84) |
| 6 | Vinyl alcohol butylene | 15 | Butadiene | 1.9 (10.39) |

What we claim is:

1. A process for preparing moldings of vinyl alcohol-olefin copolymer resins having an excellent impact strength, which comprises irradiating a powdery resin of vinyl alcohol-olefin copolymer selected from the group consisting of vinyl alcohol-ethylene copolymer containing 20 to 98 mol percent of ethylene, vinyl alcohol-propylene copolymer containing 15 to 98 mol percent of propylene and vinyl alcohol-butylene copolymer containing 10 to 98 mol percent of butylene with ionizing radiation, the irradiation dosage being within the range of $10^4$ to $10^8$ roentgens, contacting the irradiated resin with a monomer mixture of a radical-copolymerizable vinyl monomer and a dienic compound selected from the group consisting of 1,3-butadiene and polymerizable substituted derivatives thereof in such a state that said resin does not lose the powdery form thereby producing a copolymer resin containing graft copolymers and molding the resulting resin to obtain the moldings.

2. A process for preparing moldings of vinyl alcohol-olefin copolymer resins having an excellent impact strength, which comprises irradiating a powdery resin of vinyl alcohol-olefin copolymer selected from the group consisting of vinyl alcohol-ethylene copolymer containing 20 to 98 mol percent of ethylene, vinyl alcohol-propylene copolymer containing 15 to 98 mol percent of propylene and vinyl alcohol-butylene copolymer containing 10 to 98 mol percent of butylene with ionizing radiation, the irradiation dosage being within the range of $10^4$ to $10^8$ roentgens, contacting the irradiated resin with a dienic compound selected from the group consisting of 1,3-butadiene and polymerizable substituted derivatives thereof in such a state that said resin does not lose the powdery form thereby producing a copolymer resin containing graft copolymers and molding the resulting resin to obtain the moldings.

3. A process for preparing moldings of vinyl alcohol-ethylene copolymer resin having an excellent impact strength, which comprises irradiating a powdery resin of vinyl alcohol-ethylene copolymer containing 20 to 98 mol percent of ethylene with ionizing radiation, the irradiation dosage being within the range of $10^4$ to $10^8$ roentgens, contacting the irradiated resin with 1,3-butadiene in such a state that said resin does not lose the powdery form thereby producing a copolymer resin containing graft copolymers and molding the resulting resin to obtain the moldings.

4. A process claimed in claim 1, wherein said resulting resin is milled before being molded.

5. A process claimed in claim 1, wherein the vinyl monomer is selected from the group consisting of styrene, acrylonitrile and methyl methacrylate.

6. A process claimed in claim 5, wherein the vinyl monomer is styrene.

7. A process claimed in claim 5, wherein the vinyl monomer is acrylonitrile.

8. A process claimed in claim 2, wherein the dienic compound is 1,3-butadiene.

9. A process claimed in claim 2, wherein the dienic compound is used in the form of a solution.

10. A process claimed in claim 9, wherein the dienic compound is 1,3-butadiene and the solvent is methanol.

11. A process claimed in claim 3, wherein said 1,3-butadiene is used in the form of a mixture with styrene.

12. A process claimed in claim 3, wherein said 1,3-butadiene is used in the form of a mixture with acrylonitrile.

References Cited

FOREIGN PATENTS 690,295  7/1964  Canada.

MURRAY TILLMAN, *Primary Examiner.*

SAMUEL H. BLECH, *Examiner.*

R. B. TURER, *Assistant Examiner.*